United States Patent [19]
Nakatsugawa

[11] Patent Number: 6,069,898
[45] Date of Patent: May 30, 2000

[54] DATA TRANSMITTER, DATA RECEIVER, DATA COMMUNICATION SYSTEM, AND DATA COMMUNICATION METHOD

[75] Inventor: Yoshinori Nakatsugawa, Susono, Japan

[73] Assignee: Yazaki Corporation, Tokyo, Japan

[21] Appl. No.: 08/997,726

[22] Filed: Dec. 24, 1997

[30] Foreign Application Priority Data

Dec. 27, 1996 [JP] Japan ................................. 8-351406

[51] Int. Cl.$^7$ ................................................. H04J 3/24
[52] U.S. Cl. ................................... 370/474; 375/220
[58] Field of Search .................................. 370/474, 277, 370/392, 465, 527, 529, 533, 536, 538, 542, 543, 544; 455/450, 452, 557, 309, 558, 205; 375/295, 298, 300, 302, 316, 320, 322, 324, 219, 220, 356; 348/723, 724, 726; 704/200, 201, 229, 500, 501, 503, 504

[56] References Cited

U.S. PATENT DOCUMENTS

| | | | |
|---|---|---|---|
| 5,430,485 | 7/1995 | Lankford et al. | 348/423 |
| 5,440,345 | 8/1995 | Shimoda | 348/411 |
| 5,502,499 | 3/1996 | Birch et al. | 348/521 |
| 5,534,914 | 7/1996 | Flohr et al. | 379/202 |
| 5,552,940 | 9/1996 | Umenoto et al. | 386/101 |
| 5,598,415 | 1/1997 | Nuber et al. | 370/474 |
| 5,611,038 | 3/1997 | Shaw et al. | 395/500 |
| 5,654,747 | 8/1997 | Ottesen et al. | 348/12 |
| 5,668,601 | 9/1997 | Okada et al. | 370/503 |
| 5,706,385 | 1/1998 | Suzuki et al. | 386/34 |
| 5,719,943 | 2/1998 | Amada et al. | 380/49 |
| 5,732,391 | 3/1998 | Fiocca | 704/229 |
| 5,745,837 | 4/1998 | Fuhrmann | 348/12 |
| 5,761,636 | 6/1998 | Botlon et al. | 704/229 |
| 5,793,416 | 8/1998 | Rostoker et al. | 455/452 |
| 5,821,995 | 10/1998 | Nisikawa | 370/433 |
| 5,832,085 | 11/1998 | Inoue et al. | 348/441 |
| 5,841,794 | 11/1998 | Inoue et al. | 714/771 |
| 5,844,596 | 12/1998 | Goodman | 379/90.01 |
| 5,847,779 | 12/1998 | Acampora et al. | 375/357 |
| 5,852,805 | 12/1998 | Hiratsuka et al. | 704/500 |
| 5,878,188 | 3/1999 | Amada et al. | 386/101 |
| 5,933,534 | 8/1999 | Yoshimoto et al. | 382/236 |

FOREIGN PATENT DOCUMENTS

| | | |
|---|---|---|
| 6-500454 | 1/1994 | Japan . |
| 6-284140 | 10/1994 | Japan . |

*Primary Examiner*—Dang Ton
*Assistant Examiner*—Phirin Sam
*Attorney, Agent, or Firm*—Oblon, Spivak, McClelland, Maier & Neustadt, P.C.

[57] ABSTRACT

Data compression of digital data, which are sent out sequentially from a connected external device and are divided into blocks, is executed on a time base by executing modulation process in unit of predetermined number of blocks, and the digital data in which header information including at least a destination is allocated to a free time space generated by the data compression are transmitted to a predetermined destination. On the contrary, the header information are extracted from the digital data received from the sender and then erased, and the digital data which are subjected to demodulation process to demodulate a frequency into a transmission speed peculiar to the external device by executing data expansion on the time base are received by the external device.

16 Claims, 8 Drawing Sheets

FIG.8A | DATA 1 | DATA 2 | DATA 3 | DATA 4 |

FIG.8B | HEADER | DATA 1 | DATA 2 | DATA 3 | DATA 4 |

6,069,898

DATA TRANSMITTER, DATA RECEIVER, DATA COMMUNICATION SYSTEM, AND DATA COMMUNICATION METHOD

BACKGROUND OF THE INVENTION

1. Field of the Invention

The present invention relates to a data transmitter, a data receiver, a data communication system, and a data communication method, capable of achieving smooth two-way communications between a connected external device and a destination or a sender in real time.

2. Description of the Prior Art

In the prior art, as an interface for use in a commonly used data communication system, there have been known D2B (Audio, video and audiovisual systems Domestic Digital Bus: CIE/IEC 1030) used upon transmitting digital audio data, digital audio interface (Digital audio interface: CIE/IEC 958), etc.

In FIGS. 1 and 2, a frame format and a subframe format of a signal in a digital audio interface in which blocks, frames, and subframes are arranged in a hierarchical manner is shown respectively. As shown in FIG. 2, respective items, i.e., a synchronizing preamble, an audio auxiliary, an audio sample word, a validity flag, a user data, a channel status, and a parity bit are allocated to a subframe which is placed at a lowermost layer. One frame of 64 bit is constituted by combining a pair of 32 bit subframe which are allocated to right and left two channels respectively and thus one block is composed of successive 192 frames.

Meanwhile, at the time when digital audio data are transferred from a certain sender to a particular destination, commonly header information including a sender, a destination, etc. are allocated to a group of digital audio data as a transferred object in a sender.

Upon allocating the header information to the digital audio data having the above data format, for example, header information are allocated to a user data area which is used freely by the user, etc. In this manner, the digital audio data can be transmitted firmly to a predetermined destination.

However, according to a conventional header information allocation method as described above, there have been problems to be overcome such that a large capacity memory has to be prepared as a buffer memory, in which the digital data as a transfer object are stored temporarily, in the sender and that the digital data cannot be transferred to the destination in real time because of a waiting time required for data accumulation.

In more detail, in the header information allocating method in the prior art, the header information are allocated over plural blocks because a considerable number of bits are required for allocating the header information. For this reason, the digital data ranging over plural blocks must be stored in the buffer memory until interpretation of the header information allocated over plural blocks has been completed in the sender. As a consequence, in the prior art, a large capacity memory has to be prepared as the buffer memory and the digital data cannot be transferred to the destination in real time due to the waiting time required for data accumulation.

SUMMARY OF THE INVENTION

The present invention has been made in view of the above circumstances, and it is an object of the present invention to provide a data transmitter, a data receiver, a data communication system, and a data communication method, capable of achieving smooth two-way communications between a connected external device and a destination or a sender in real time by executing data compression of digital data, which are sent out sequentially from a connected external device and are divided into blocks, on a time base in terms of execution of modulation process in unit of predetermined number of blocks, then allocating the digital data in which header information including at least a destination to a free time space generated by the data compression, and then transmitting to a predetermined destination the digital data to which the header information are allocated, while are extracting and erasing the header information from the digital data received from the sender, then executing demodulation process to demodulate a frequency into a transmission speed peculiar to the external device by executing data expansion on the time base, and then receiving the digital data which are subjected to the demodulation process by the connected external device.

In order to achieve the above object, according to an aspect of the present invention, there is provided a data transmitter comprising: a transmitter side interface for converting digital data which are sent out sequentially from an external device connected to the data transmitter into a proper format and then sending out the digital data sequentially; a modulator for executing modulation process of the digital data which are divided into blocks and sent out sequentially from the transmitter side interface in unit of predetermined number of blocks to thus execute data compression on a time base; header information allocating means for allocating header information including at least a destination to a free time space generated by the data compression executed by the modulator; and transmitting means for transmitting to a predetermined destination the digital data to which the header information has been allocated by the header information allocating means.

According to the present invention, at first the digital data which are sent out sequentially from the connected external device are converted into the proper format by the transmitter side interface and then output. The data compression of the digital data which are sent out sequentially from the interface and are divided into blocks are executed on the time base in terms of execution of modulation process in unit of predetermined number of blocks. The header information including at least a destination are allocated to a free time space generated by the data compression in the modulator by the header information allocating means. The compressed packet data which are subjected to two system of processes consisting of the data compression process on the time base by means of modulation and the header information allocating process are then transmitted to the predetermined destination by the transmitting means.

In this manner, according to the data transmitter of the present invention, compressed packet data which are subjected to above two system of processes can be transmitted to a desired destination in real time because respective data transfer times required before and after the above two system of processes are executed are set to the same time intervals.

In the preferred embodiment of the present invention, if the predetermined number of blocks which are subjected to the data compression is assumed as an integer K and a number of blocks necessary for allocating the header information is assumed as an integer H, a ratio of a clock frequency before modulation to a clock frequency after modulation is equal to a ratio of K to K+H.

In the preferred embodiment of the present invention, the digital data are digital audio data.

In the preferred embodiment of the present invention, the external device is one of a personal computer, a telephone set, a DVD-ROM drive, a digital TV set, and a CD-ROM drive.

According to another aspect of the present invention, there is provided a data receiver comprising: receiving means for receiving digital data transmitted from a sender; header information erasing means for extracting header information including at least a destination from the digital data received by the receiving means and erasing the header information; a demodulator for executing demodulation process to demodulate into a transmission speed peculiar to an external device connected to the data receiver by executing data expansion of the digital data, from which the header information is erased by the header information erasing means, on a time base; and a receiver side interface for converting the digital data which are subjected to the demodulation process by the demodulator into a proper format and then sending out the digital data to the external device sequentially.

According to the present invention, at first the digital data which are transmitted from the sender are received by the receiving means, and then the header information are extracted from the digital data received by the receiving means and then erased by the header information erasing means. The demodulation process to demodulate a frequency into a transmission speed peculiar to the connected external device is then executed by the demodulator by executing data expansion of the digital data from which the header information are erased on the time base. The digital data which are subjected to the demodulation process are then converted into the proper format by the receiver side interface and then sent out sequentially to the connected external device.

Like this, according to the data receiver of the present invention, the digital data the frequency of which is demodulated into the transmission speed peculiar to the connected external device can be received in real time because data expansion of the digital data from which the header information are erased is executed on the time base.

In the preferred embodiment of the present invention, if a number of blocks which are subjected to the data expansion is assumed as an integer K+H and a number of blocks into which the header information is written is assumed as an integer H, a ratio of a clock frequency before demodulation to a clock frequency after demodulation is equal to a ratio of K+H to K.

According to still another aspect of the present invention, there is provided a data communication system comprising: a transmitter side interface for converting digital data which are sent out sequentially from an external device connected to the data communication system into a proper format and then sending out the digital data sequentially; a modulator for executing modulation process of the digital data which are divided into blocks and sent out sequentially from the transmitter side interface in unit of predetermined number of blocks to thus execute data compression on a time base; header information allocating means for allocating header information including at least a destination to a free time space generated by the data compression executed by the modulator; transmitting means for transmitting to a predetermined destination the digital data to which the header information has been allocated by the header information allocating means; receiving means for receiving the digital data transmitted from a sender; header information erasing means for extracting the header information including at least a destination from the digital data received by the receiving means and then erasing the header information; a demodulator for executing demodulation process to demodulate into a transmission speed peculiar to the external device by executing data expansion of the digital data, from which the header information is erased by the header information erasing means, on the time base; and a receiver side interface for converting the digital data which are subjected to the demodulation process by the demodulator into the proper format and then sending out the digital data to the external device sequentially.

According to the present invention, at the time when the digital data which are sent out sequentially from the connected external device are transmitted to the predetermined destination, at first the digital data which are sent out sequentially from the connected external device are converted into the proper format by the transmitter side interface and then output. The data compression of the digital data which are sent out sequentially from the interface and are divided into blocks are executed on the time base in terms of execution of modulation process in unit of predetermined number of blocks. The header information including at least a destination are allocated to the free time space generated by the data compression in the modulator by the header information allocating means. The compressed packet data which are subjected to two system of processes consisting of the data compression process on the time base by means of modulation and the header information allocating process are then transmitted to the predetermined destination by the transmitting means.

While, at the time when the digital data which are transmitted from the sender are received by the connected external device, at first the digital data which are transmitted from the sender are received by the receiving means, and then the header information are extracted from the digital data received by the receiving means and then erased by the header information erasing means. The demodulation process to demodulate a frequency into a transmission speed peculiar to the connected external device is then executed by the demodulator by executing data expansion of the digital data from which the header information are erased on the time base. The digital data which are subjected to the demodulation process are then converted into the proper format by the receiver side interface and then sent out sequentially to the connected external device.

In this manner, according to the data communication system of the present invention, at the time when the digital data which are sent out sequentially from the connected external device are transmitted to the predetermined destination, compressed packet data which are subjected to above two system of processes can be transmitted to the desired destination in real time because respective data transfer times required before and after the above two system of processes are executed are set to the same time intervals. On the contrary, at the time when the digital data which are transmitted from the sender are received by the connected external device, data expansion of the digital data from which the header information are erased is executed on the time base and then the digital data the frequency of which is demodulated into the transmission speed peculiar to the connected external device can be received in real time.

In the preferred embodiment of the present invention, a ratio of a clock frequency before modulation to a clock frequency after modulation is equal to a ratio of K to K+H if the predetermined number of blocks which are subjected to the data compression is assumed as an integer K and a number of blocks necessary for allocating the header information is assumed as an integer H, and a ratio of the clock frequency before demodulation to the clock frequency after demodulation is equal to a ratio of K+H to K if a number of blocks which are subjected to the data expansion is assumed as an integer K+H and a number of blocks into which the header information is written is assumed as an integer H.

According to yet still another aspect of the present invention, there is provided a data communication method comprising the steps of: converting digital data which are sent out sequentially from an external device into a proper format and then outputting the digital data sequentially; executing data compression on a time base by executing modulation process of the digital data which are divided into blocks after conversion in unit of predetermined number of blocks; allocating header information including at least a destination to a free time space generated by the data compression; transmitting to a predetermined destination compressed packet data after the header information has been allocated; whereby the digital data which are sent out from the external device can be transmitted to the predetermined destination, receiving the digital data transmitted from the sender; extracting the header information from the digital data received and then erasing the header information; executing demodulation process to demodulate into a transmission speed peculiar to the external device by executing data expansion of the digital data, from which the header information is erased, on the time base; and converting the digital data which are subjected to the demodulation process into the proper format and then sending out the digital data to the external device sequentially; whereby the digital data which are transmitted from the sender can be received by the external device.

According to the present invention, at the time when the digital data which are sent out sequentially from the connected external device are transmitted to the predetermined destination, at first the digital data which are sent out sequentially from the connected external device are converted into the proper format by the transmitter side interface and then output. The data compression of the digital data which are sent out sequentially from the interface and are divided into blocks are executed on the time base in terms of execution of modulation process in unit of predetermined number of blocks. The header information including at least a destination are allocated to the free time space generated by the data compression in the modulator. The compressed packet data which are subjected to two system of processes consisting of the data compression process on the time base by means of modulation and the header information allocating process are then transmitted to the predetermined destination.

Meanwhile, at the time when the digital data which are transmitted from the sender are received by the connected external device, at first the digital data which are transmitted from the sender are received, and then the header information are extracted from the digital data received and then erased. The demodulation process to demodulate a frequency into a transmission speed peculiar to the connected external device is then executed by the demodulator by executing data expansion of the digital data from which the header information are erased on the time base. The digital data which are subjected to the demodulation process are then converted into the proper format and then sent out sequentially to the connected external device.

In this manner, according to the data communication method of the present invention, at the time when the digital data which are sent out sequentially from the connected external device are transmitted to the predetermined destination, compressed packet data which are subjected to above two system of processes can be transmitted to the desired destination in real time because respective data transfer times required before and after the above two system of processes are executed are set to the same time intervals. On the other hand, at the time when the digital data which are transmitted from the sender are received by the connected external device, data expansion of the digital data from which the header information are erased is executed on the time base and then the digital data the frequency of which is demodulated into the transmission speed peculiar to the connected external device can be received in real time.

The nature, principle and utility of the invention will become more apparent from the following detailed description when read in conjunction with the accompanying drawings.

BRIEF DESCRIPTION OF THE DRAWINGS

In the accompanying drawings:

FIG. 8A is a view showing a block data before data compression process and header information (Header) allocating process are executed; and FIG. 8B is a view showing a block data after data compression process and header information (Header) allocating process are executed.

DESCRIPTION OF THE PREFERRED EMBODIMENT

A data transmitter, a data receiver, a data communication system, and a data communication method according to an embodiment of the present invention will be explained in detail with reference to accompanying drawings hereinafter.

In the embodiment of the present invention, a case will be explained as an example hereunder, where one of various external devices which execute data exchange at transmission speeds specified based on natural communication standards individually is connected directly to a data communication system according to the present invention and also other external devices are connected to a data communication system according to the present invention via a bus system data transfer line another communication systems. Such various external devices are, for example, used in a room of common home and include a personal computer, a telephone set, a DVD-ROM drive, a digital TV set, a CD-ROM drive, etc.

Figure 1:
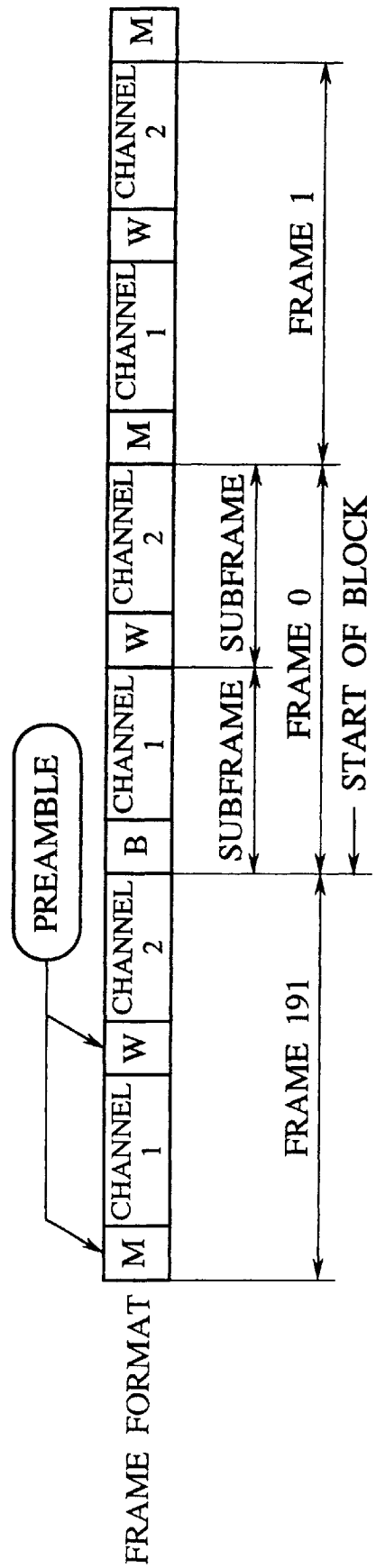
FIG. 1 is a view showing a frame format of a signal in a digital audio interface.
Figure 2:
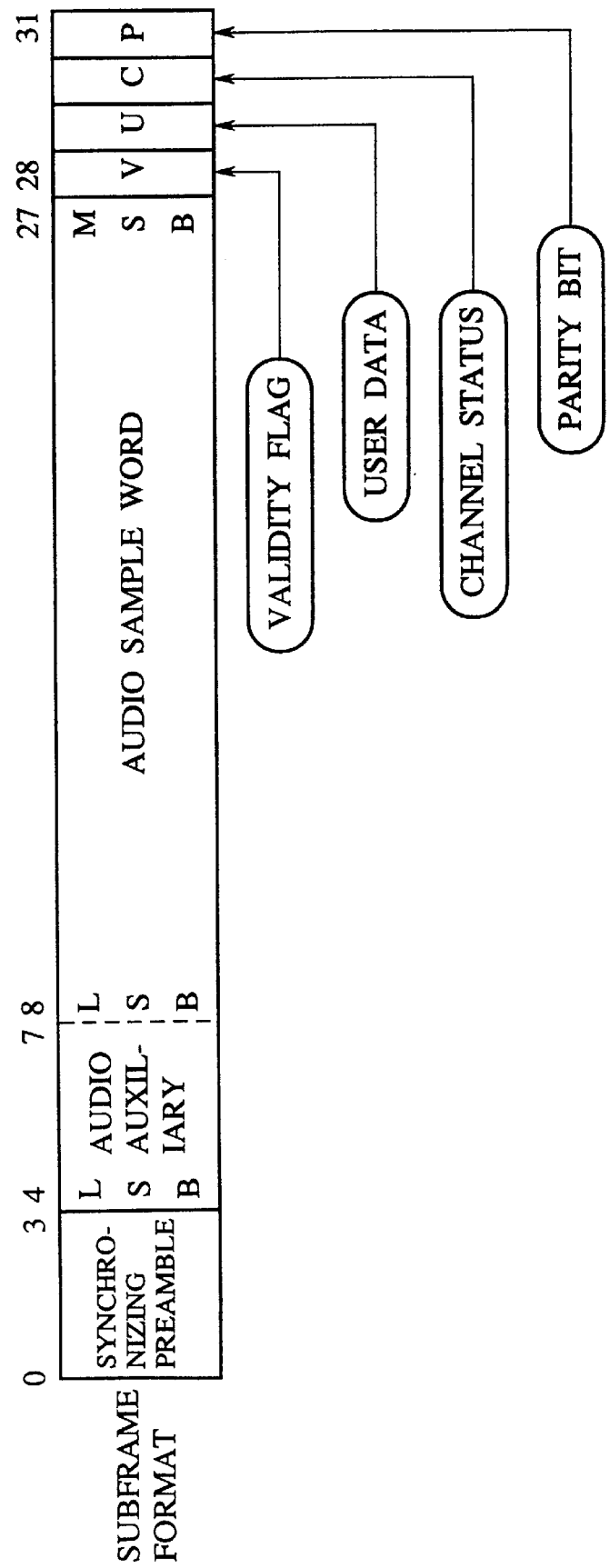
FIG. 2 is a view showing a subframe format of the signal in the digital audio interface.
Figure 3:
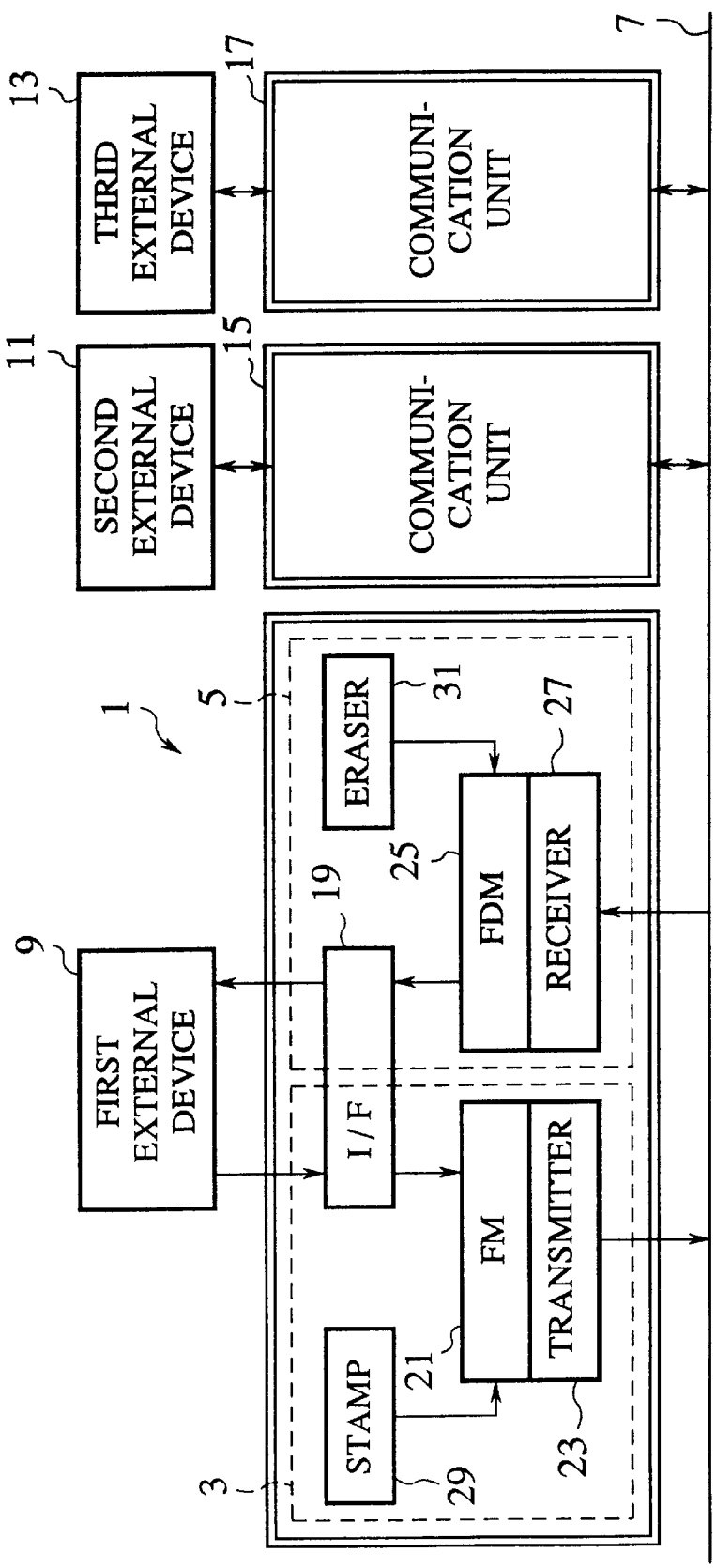
FIG. 3 is a block circuit diagram showing a configuration of a data communication system according to an embodiment of the present invention.

At first, as shown in FIG. 3, a data communication system 1 according to an embodiment of the present invention is constructed to include a data transmitter 3 and a data receiver 5. The data communication system 1 has a function of transmitting digital data such as sound, image, etc. which are sent out from a first external device 9 connected to the data communication system 1 to predetermined other external devices 11, 13 via a data transfer line 7 and other communication units 15, 17, and a function of sending out the digital data which are received from other external devices 11, 13 via other communication units 15, 17 and the data transfer line 7 to the first external device 9.

In more detail, the data communication system 1 according to an embodiment of the present invention comprises a data transmitter 3 executes data compression of digital data, which are sent out sequentially from the first external device 9 and are divided into blocks, on a time base by executing modulation process in unit of predetermined number of blocks, then allocating header information (Header), which include appropriately a destination, a sender, a synchronizing signal, etc., to a free time space generated by the data compression, and then transmitting the digital data, to which the header information (Header) are allocated, to a predetermined destination such as the second external device 11 or the third external device 13, and a data receiver 5 extracts the header information (Header) from the digital data received from the second external device 11 or the third external device 13 and erases the header information (Header), then executes demodulation process to demodulate the frequency into a transmission speed peculiar to the first external device 9 by executing data expansion on the time base, and then sends the digital data which have been subjected to the demodulation process to the first external device 9.

As shown in FIG. 3, the data transmitter 3 in the present invention is constructed to include an interface (I/F) 19 for converting the digital data, which are sent out sequentially from the first external device 9, into a proper format and for outputting the converted digital data; a modulator (FM) 21 for executing data compression of the digital data, which are sent out sequentially from the interface (I/F) 19 and are divided into blocks, on a time base by executing frequency modulation process in unit of predetermined number of blocks; a header information allocating section (STAMP) 29 for allocating header information (Header), which include a destination, a sender, a synchronizing signal, etc. appropriately, to a free time space generated by the data compression executed by the modulator (FM) 21; and a transmitter section (Transmitter) 23 for transmitting the digital data, to which the header information (Header) are allocated by the header information allocating section (STAMP) 29, to a predetermined destination such as the second external device 11 or the third external device 13.

Also, as shown in FIG. 3, the data receiver 5 in the present invention is constructed to include a receiver section (Receiver) 27 for receiving the digital data transmitted from the second external device 11 or the third external device 13; a header information erasing section (ERASER) 31 for extracting the header information (Header) from the digital data received by the receiver section (Receiver) 27 and then erasing the header information (Header); a demodulator (FDM) 25 for executing demodulation process to demodulate the frequency into a transmission speed peculiar to the first external device 9 by executing data expansion of the digital data, from which the header information (Header) have been erased by the header information erasing section (ERASER) 31, on the time base; and an interface (I/F) 19 for converting the digital data which have been subjected to the demodulation process by demodulator (FDM) 25 into the proper format and then sending out such digital data sequentially to the first external device 9.

A clock generator (not shown) for generating various clock signals is connected to respective constituent sections including the modulator (FM) 21 and the demodulator (FDM) 25. Based on a clock frequency SCK which is applied before modulation process and after demodulation process and a clock frequency HCK which is applied after modulation process and before demodulation process, both being supplied from the clock generator and described later, the modulator (FM) 21 and the demodulator (FDM) 25 execute the modulation process and the demodulation process respectively.

A concrete configuration of peripheral circuits of the modulator (FM) 21 and the header information allocating section (STAMP) 29 constituting a part of the above data transmitter 3 will be explained in detail with reference to FIG. 4 hereunder. Such an example will be illustrated that one block is added to four blocks, then the digital data are packeted by allocating the header information (Header) to this added block, then the packet data are compressed, and then compressed packet data are output.

Figure 4:
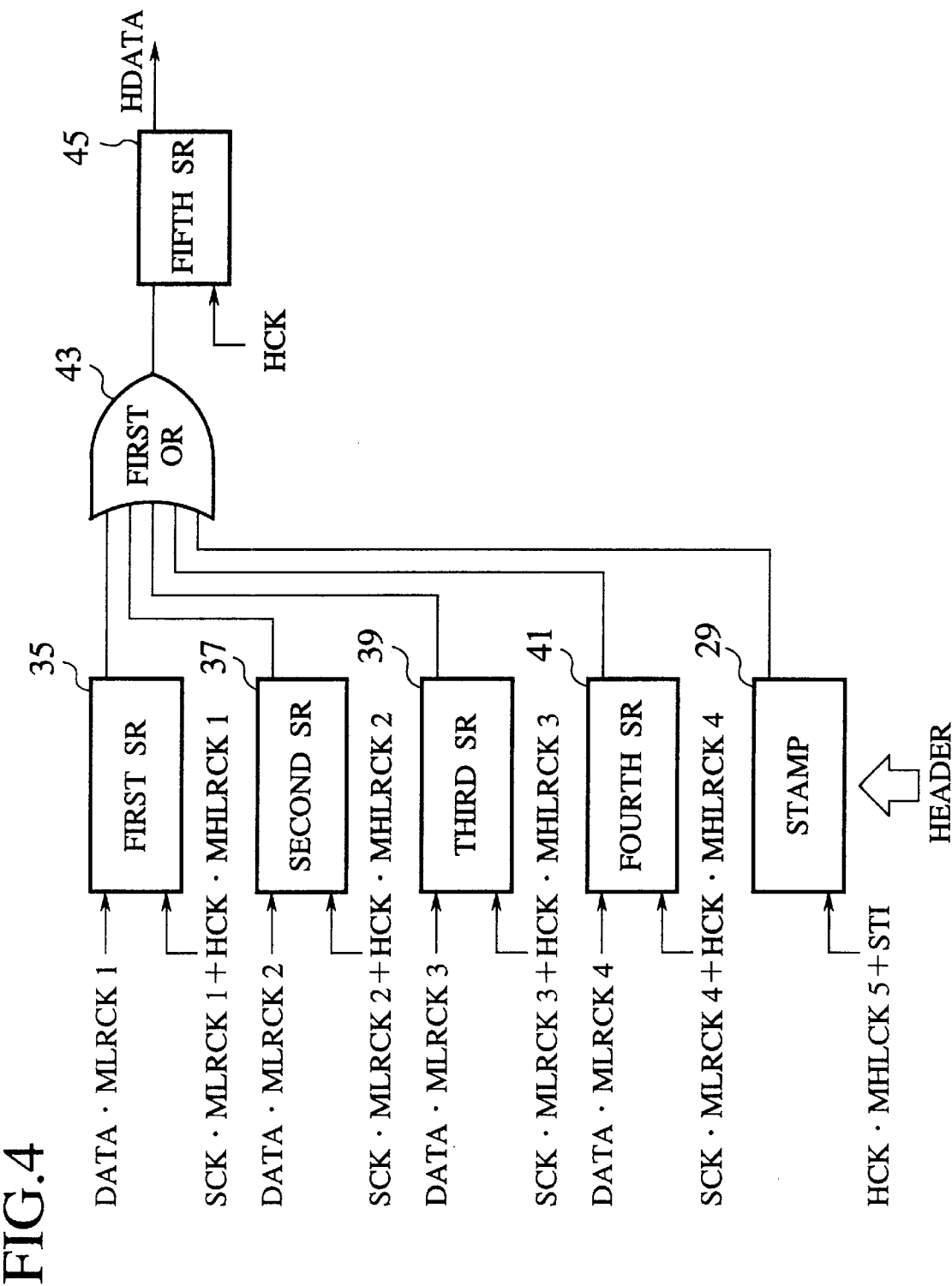
FIG. 4 is a block circuit diagram showing a configuration of a data transmitter according to the embodiment of the present invention.

As shown in FIG. 4, the modulator (FM) 21 is constructed to include first to fourth shift registers (abbreviated simply as "SRs" hereinafter) 35, 37, 39, 41 for serially inputting/outputting the digital data, which are sent out from the interface (I/F) 19, in synchronism with predetermined clock frequencies and timings respectively, a first logical sum circuit (abbreviated simply as "OR" hereinafter) 43 for receiving in parallel the digital data, which are serially output from the first to fourth SRs 35, 37, 39, 41 respectively, and the digital data, which are sent out from the header information allocating section (STAMP) 29 which inputs and outputs the header information (Header) in synchronism with the predetermined clock frequency and the timing, and serially outputting logical sum data of respective output digital data sequentially; and a fifth SR 45 for receiving the logical sum data being serially output from the first OR 43 in synchronism with the predetermined clock frequency and the timing and then serially outputting the data in the form of packet data HDATA to which the header information (Header) has been allocated and the data compression process has been applied.

A concrete configuration of peripheral circuits of the demodulator (FDM) 25 and the header information erasing section (ERASER) 31 constituting a part of the above data receiver 5 will be explained in detail with reference to FIG. 5 hereunder. Such an example will be illustrated that the header information (Header) are extracted and erased from the compressed packet data, then the digital data from which the header information (Header) are erased are expanded on the time base, and then expanded digital data are output.

Figure 5:
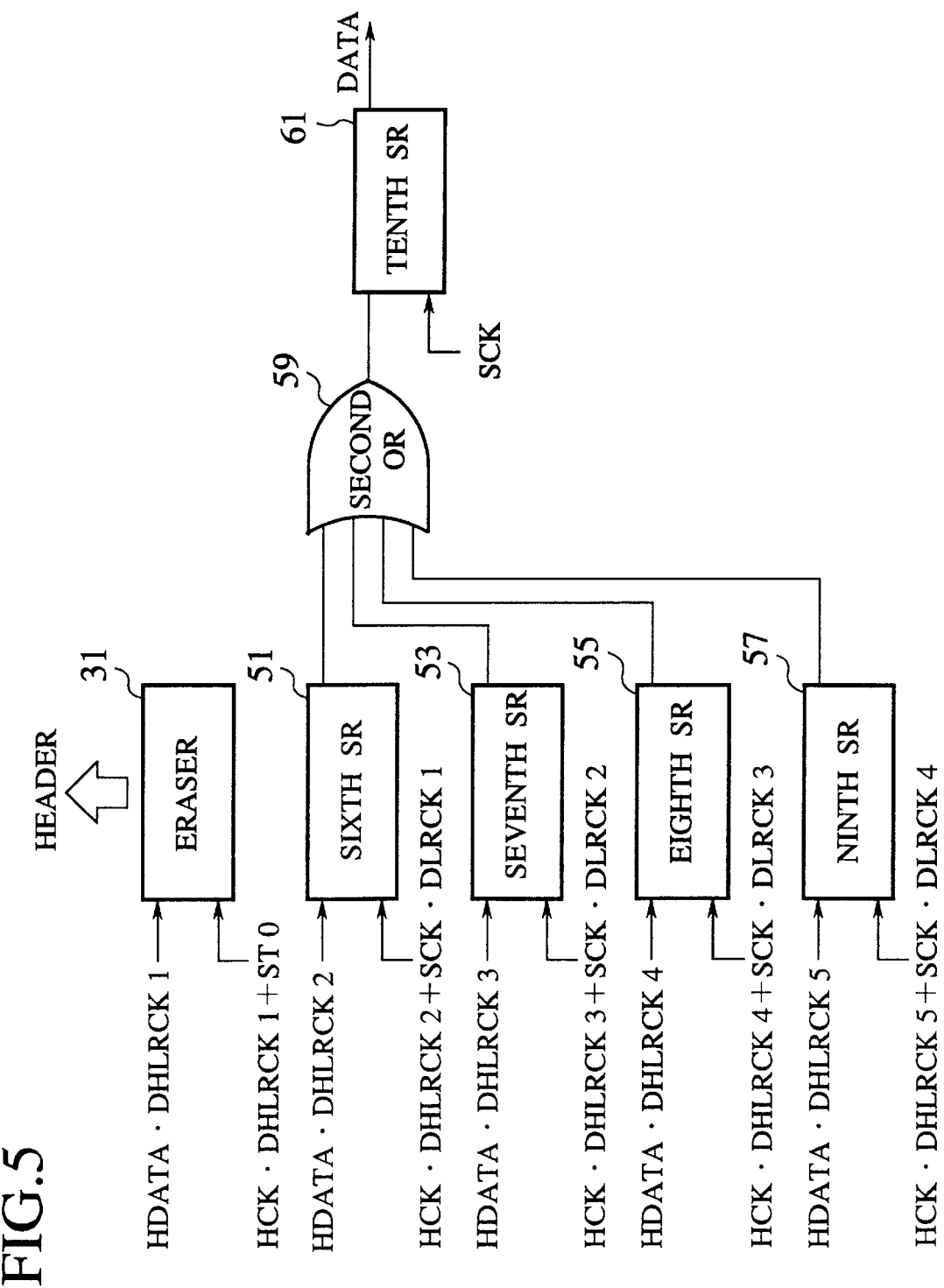
FIG. 5 is a block circuit diagram showing a configuration of a data receiver according to the embodiment of the present invention.

As shown in FIG. 5, the demodulator (FDM) 25 is constructed to include sixth to ninth SRs 51, 53, 55, 57 for serially inputting/outputting, in synchronism with predetermined clock frequencies and timings respectively, the digital data from which the header information (Header) are erased by the header information erasing section (ERASER) 31 which extracts the header information (Header) in synchronism with predetermined clock frequencies and timing; a second OR 59 for receiving in parallel the digital data, which are sent out serially from the sixth to ninth SRs 51, 53, 55, 57 respectively, and serially outputting the logical sum data of respective output digital data sequentially; and a tenth SR 61 for receiving the logical sum data being output from the second OR 59 in synchronism with the predetermined clock frequency and the timing and then serially outputting the data in the form of digital data DATA which have been expanded on the time base.

Next, an operation of the data transmitter, the data receiver, and the data communication system according to the present invention constructed as above will be explained hereunder. Here, since operations of the data transmitter 3 and the data receiver 5 are included in the operation of the data communication system 1, their explanation will be omitted.

According to the data communication system 1 of the present invention, at the time when the digital data sent out from the first external device 9 are transmitted to the predetermined destination such as other external device, at first the digital data sequentially sent out from the first external device 9 are converted into the proper format in the interface (I/F) 19 and then output. Then, data compression of the digital data which are sequentially sent out from the interface (I/F) 19 and divided into blocks is executed in the modulator (FM) 21 on the time base by executing frequency modulation process in unit of predetermined number of blocks. In the header information allocating section (STAMP) 29, header information (Header) including appropriately the destination, the sender, the synchronizing signal, or the like are allocated to a free time area generated by the data compression in the modulator (FM) 21. Thus, compressed packet data can be obtained by executing two system of processes, i.e., data compression process by frequency modulation on the time base and header information (Header) allocation process. Such compressed packet data are transferred to the predetermined destination such as the second external device 11 or the third external device 13 by the transmitter section (Transmitter) 23.

In practice, as described later, the data compression process by frequency modulation on the time base and the header information (Header) allocation process are executed in parallel simultaneously. In addition, a transfer time of the block data as shown in FIG. 8A before the above two system of processes are executed and a transfer time of the compressed packet data as shown in FIG. 8B after the above two system of processes are executed are set to be equal by adjusting mutual clock frequencies into a predetermined relationship. Under the assumption that the number of blocks to be packeted is K (where K is an integer), the number of blocks necessary for allocating the header information is H (where H is an integer), the clock frequency before modulation is SCK, and the clock frequency after modulation is HCK, this predetermined relationship can be expressed by $$HCK = SCK \times (K+H)/K \tag{1}$$

In other words, it can be found that the clock frequency before modulation SCK and the clock frequency after modulation HCK can be always correlated with an integral ratio of K: (K+H). In the demodulation process described later, the clock frequency before demodulation HCK and the clock frequency after demodulation SCK are set to maintain the above predetermined relationship.

Accordingly, according to the data communication system 1 of the present invention, if the clock frequency before modulation SCK and the clock frequency after modulation HCK are correlated with the integral ratio of K: (K+H) and also K blocks as a packeted object are converted into (K+H) compressed packet data by executing the frequency modulation in synchronism with the clock frequency after modulation HCK so as to maintain the same data transfer time before and after the modulation, then (K+H) compressed packet data can be transferred to the desired destination in real time.

On the contrary, according to the data communication system 1 of the present invention, at the time when the digital data transmitted from the sender such as the second external device 11 or the third external device 13 are received by the first external device 9, at first the digital data transmitted from the second external device 11 or the third external device 13 are received by the receiving section (Receiver) 27, and then the header information (Header) are extracted from the digital data received by the receiver section (Receiver) 27 and then erased by the header information erasing section (ERASER) 31. The demodulation process to demodulate the frequency into a communication speed peculiar to the first external device 9 is executed in the demodulator (FDM) 25 by executing, on the time base, data expansion of the digital data from which the header information (Header) are erased by the header information erasing section (ERASER) 31. The digital data which are subjected to the demodulation process by the demodulator (FDM) 25 are converted into the proper format by the interface (I/F) 19 and then sent out sequentially to the first external device 9.

Figure 6:
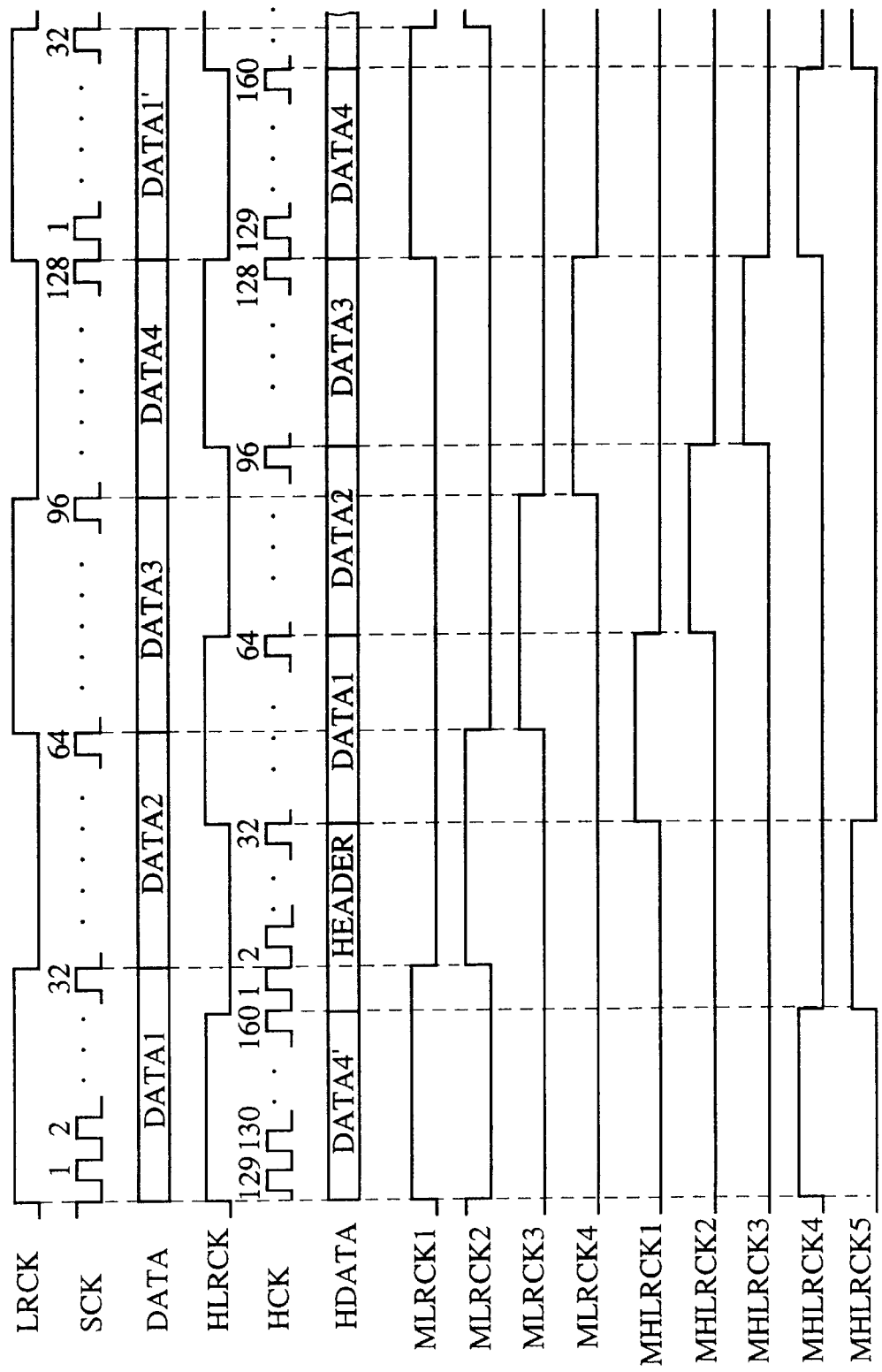
FIG. 6 is a timing chart for illustrating an operation of the data transmitter according to the embodiment of the present invention.

An operation of the modulator (FM) 21 shown in FIG. 4 will be explained with reference to a timing chart shown in FIG. 6 hereunder.

First, the first to fourth SRs 35, 37, 39, 41 can serially receive the predetermined number K of the block data DATA as the packeted object block by block in synchronism with the clock frequency before modulation SCK and also in synchronism with block data timing clocks LRCK (MLRCK1 to MLRCK4) generated to provide a status "H" at individual timings corresponding to unit blocks respectively. In addition, the first to fourth SRs 35, 37, 39, 41 can serially output, in synchronism with the clock frequency after modulation HCK, the block data DATA (data 1 to data 4) which are received serially block by block in synchronism with the clock frequency before modulation SCK.

On the contrary, the header information allocating section (STAMP) 29 can receive the header information (Header) in parallel based on a STI signal whose status becomes "H" at a predetermined timing before MHLRCK5=H and then serially output header information (Header) in synchronism with the clock frequency after modulation HCK at a timing by which a status of MHLRCK 5 becomes "H".

Respective frequency-modulated data which are serially output from the first to fourth SRs 35, 37, 39, 41 and the header information allocating section (STAMP) 29 are subjected to the logical sum process on the time base by the first OR 43 and then serially output to the fifth SR 45. The fifth SR 45 can serially output the modulated and compressed packet data HDATA (Header, data 1 to data 4) in synchronism with the clock frequency HCK after modulation and also in synchronism with the compressed packet data timing clock MHLRCK.

Figure 7:
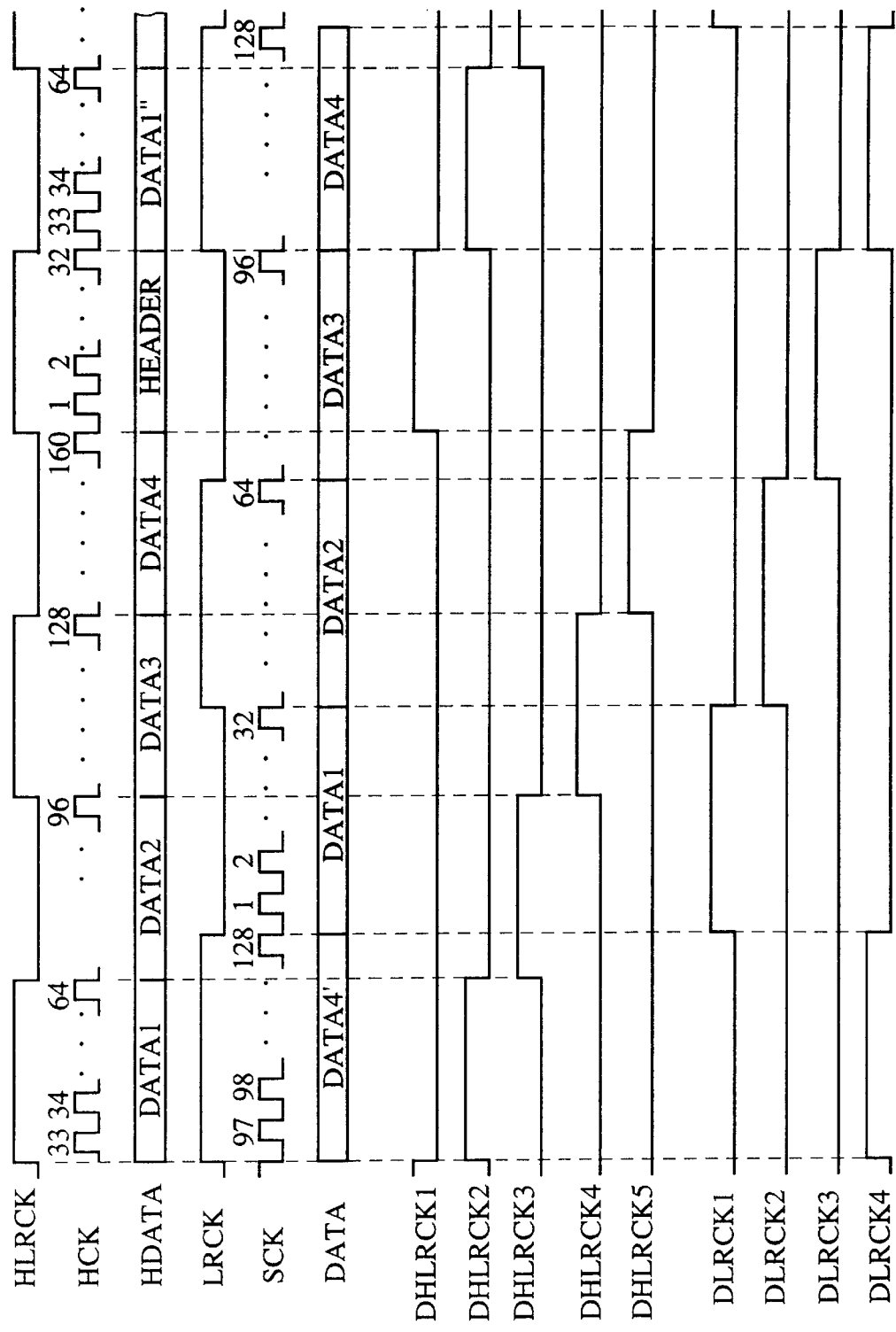
FIG. 7 is a timing chart for illustrating an operation of the data receiver according to the embodiment of the present invention.

Next, an operation of the demodulator (FDM) 25 shown in FIG. 5 will be explained with reference to a timing chart shown in FIG. 7 hereunder.

First, the sixth to ninth SRs 51, 53, 55, 57 can serially receive the compressed packet data HDATA block by block in synchronism with the clock frequency HCK before demodulation and also in synchronism with the above compressed packet data timing clock HLRCK (DHLRCK 1 to DHLRCK 4). In addition, the sixth to ninth SRs 51, 53, 55, 57 can serially output, in synchronism with the clock frequency SCK after demodulation respectively, HDATA (data 1 to data 4) which are serially received block by block in synchronism with the clock frequency HCK before demodulation respectively.

Conversely, the header information erasing section (ERASER) 31 can receive the header information (Header) in series in synchronism with the clock frequency HCK before demodulation at a timing by which a status of DHLRCK 1 becomes "H" and then serially output header information (Header) to a decoder (not shown) based on a STO signal whose status becomes "H" at a predetermined timing after DHLRCK1=H.

Respective frequency-demodulated data which are serially output from the sixth to ninth SRs 51, 53, 55, 57 are subjected to the logical sum process on the time base by the second OR 59 and then serially output to the tenth SR 61. The tenth SR 61 can serially output the demodulated block data DATA (data 1 to data 4) block by block in synchronism with the clock frequency SCK after demodulation and also in synchronism with the above block data timing clock LRCK.

Though has been explained in detail, the present invention is not limited to the above embodiments, and may be implemented as other embodiments by applying appropriate modification to the present invention.

In other words, in the present invention, for example, the embodiment wherein the number K of blocks to be packeted is 4, the number H of blocks necessary for allocating the header information is 1, and the clock frequency before modulation SCK and the clock frequency after modulation HCK are set to the integral ratio of 4:5 has been explained, but the present invention is not limited to such embodiment. The appropriate number of K or H may be freely selected in the stage of design.

Besides, although the embodiment which includes the destination, the sender, the synchronizing signal, or the like appropriately has been explained as the header information (Header), the present invention is not limited to such embodiment. For instance, an acknowledge character (ACK), a negative acknowledge character (NAK), command data, etc. may be added appropriately as the header information (Header).

Moreover, although the digital audio data have been illustrated as the digital data as the transfer object in the embodiment, the present invention is not limited to such embodiment. The present invention may be applied to all type of digital data.

To the end, in the embodiment, the case has been explained, where one of various external devices which execute data exchange at transmission speeds specified based on natural communication standards individually is connected directly to a data communication system according to the present invention and also other external devices are connected to a data communication system according to the present invention via a bus system data transfer line and other communication systems. Such various external devices are, for example, used in a room of common home and include a personal computer, a telephone set, a DVD-ROM drive, a digital TV set, a CD-ROM drive, etc. However, the present invention is not limited to such embodiment and, needless to say, may be applied to all type of networks.

What is claimed is:

1. A data transmitter comprising:
   a transmitter side interface for converting digital data which are sent out sequentially from an external device connected to the data transmitter into a proper format and then sending out the digital data sequentially;
   a modulator for executing a time base modulation process of the digital data which are divided into blocks and sent out sequentially from the transmitter side interface in a predetermined number of blocks to thus execute data compression on a time base;
   header information allocating means for allocating header information including at least a destination to a free time space generated by the data compression executed by the modulator; and
   transmitting means for transmitting to a predetermined destination the digital data to which the header information has been allocated by the header information allocating means.

2. A data transmitter according to claim 1, wherein, if the predetermined number of blocks which are subjected to the data compression is assumed as an integer K and a number of blocks necessary for allocating the header information is assumed as an integer H, a ratio of a clock frequency before modulation to a clock frequency after modulation is equal to a ratio of K to K+H.

3. A data transmitter according to claim 1, wherein the digital data are digital audio data.

4. A data transmitter according to claim 1, wherein the external device is one of a personal computer, a telephone set, a DVD-ROM drive, a digital TV set, and a CD-ROM drive.

5. A data transmitter according to claim 1, wherein the leader information further comprises a sender signal and a synchronizing signal.

6. A data receiver comprising:
   receiving means for receiving digital data transmitted from a sender;
   header information erasing means for extracting header information including at least a destination from the digital data received by the receiving means and erasing the header information;
   a demodulator for executing a time base demodulation process to demodulate into a transmission speed peculiar to an external device connected to the data receiver by executing data expansion of the digital data, less the header information that was previously erased by the header information erasing means, on a time base; and
   a receiver side interface for converting the digital data which are subjected to the demodulation process by the demodulator into a proper format and then sending out the digital data to the external device sequentially.

7. A data receiver according to claim 6, wherein, if a number of blocks which are subjected to the data expansion is assumed as an integer K+H and another number of blocks into which the header information is written is assumed as an integer H, a ratio of a first clock frequency before demodulation to a second clock frequency after demodulation is equal to a ratio of K+H to K.

8. A data receiver according to claim 6, wherein the digital data are digital audio data.

9. A data receiver according to claim 6, wherein the external device is one of a personal computer, a telephone set, a DVD-ROM drive, a digital TV set, and a CD-ROM drive.

10. A data receiver according to claim 6, wherein the header information further comprises a sender signal and a synchronizing signal.

11. A data communication system comprising:
    a transmitter side interface for converting digital data which are sent out sequentially from an external device connected to the data communication system into a proper format and then sending out the digital data sequentially;

a modulator for executing a time base modulation process of the digital data which are divided into blocks and sent out sequentially from the transmitter side interface in a predetermined number of blocks to thus execute data compression on a time base;

header information allocating means for allocating header information including at least a destination to a free time space generated by the data compression executed by the modulator;

transmitting means for transmitting to a predetermined destination the digital data to which the header information has been allocated by the header information allocating means;

receiving means for receiving the digital data transmitted from a sender;

header information erasing means for extracting the header information including at least a destination from the digital data received by the receiving means and then erasing the header information;

a demodulator for executing a time base demodulation process to demodulate into a transmission speed peculiar to the external device by executing data expansion of the digital data, from which the header information is erased by the header information erasing means, on the time base; and a receiver side interface for converting the digital data which are subjected to the demodulation process by the demodulator into the proper format and then sending out the digital data to the external device sequentially.

12. A data communication system according to claim 11, wherein a ratio of a first clock frequency before modulation to a second clock frequency after modulation is equal to a ratio of K to K+H if the predetermined number of blocks which are subjected to the data compression is assumed as an integer K and a number of blocks necessary for allocating the header information is assumed as an integer H, and a ratio of a third clock frequency before demodulation to a fourth clock frequency after demodulation is equal to a ratio of K+H to K if a number of blocks which are subjected to the data expansion is assumed as an integer K+H and a number of blocks into which the header information is written is assumed as the integer H.

13. A data communication system according to claim 11, wherein the digital data are digital audio data.

14. A data communication system according to claim 11, wherein the external device is one of a personal computer, a telephone set, a DVD-ROM drive, a digital TV set, and a CD-ROM drive.

15. A data communication system according to claim 11, wherein the header information further comprises a sender signal and a synchronizing signal.

16. A data communication method comprising the steps of:

converting digital data which are sent out sequentially from an external device into a proper format and then outputting the digital data sequentially;

executing data compression on a time base by executing modulation process of the digital data which are divided into blocks after conversion in a predetermined number of blocks;

allocating header information including at least a destination to a free time space generated by the data compression;

transmitting to a predetermined destination compressed packet data after the header information has been allocated;

whereby the digital data which are sent out from the external device can be transmitted to the predetermined destination;

receiving the digital data transmitted from the sender;

extracting the header information from the digital data received and then erasing the header information;

executing a time base demodulation process to demodulate into a transmission speed peculiar to the external device by executing data expansion of the digital data, from which the header information is erased, on the time base; and converting the digital data which are subjected to the demodulation process into the proper format and then sending out the digital data to the external device sequentially;

whereby the digital data which are transmitted from the sender can be received by the external device.

* * * * *